US007461393B1

(12) United States Patent
Kishitaka et al.

(10) Patent No.: US 7,461,393 B1
(45) Date of Patent: Dec. 2, 2008

(54) BROADCAST RECEIVER, CONTROL METHOD THEREFOR, AND PROGRAM

(75) Inventors: Yuriko Kishitaka, Saitama (JP); Koji Kashima, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/558,787

(22) Filed: Apr. 26, 2000

(30) Foreign Application Priority Data

Apr. 28, 1999 (JP) ................................ 11-122648

(51) Int. Cl.
*H04N 7/173* (2006.01)
(52) U.S. Cl. ........................... 725/131; 725/68; 725/85; 725/100
(58) Field of Classification Search ................. 725/89, 725/68, 85, 100, 131; 370/252–253, 412, 370/468; 386/83, 109
See application file for complete search history.

(56) References Cited

U.S. PATENT DOCUMENTS

| 5,398,072 | A | | 3/1995 | Auld ............................ 348/426 |
| 5,666,293 | A | | 9/1997 | Metz et al. ................ 395/200.5 |
| 5,684,791 | A | * | 11/1997 | Raychaudhuri et al. .. 370/310.2 |
| 5,892,508 | A | * | 4/1999 | Howe et al. ................... 725/131 |
| 5,978,855 | A | * | 11/1999 | Metz et al. ................... 709/249 |
| 6,020,882 | A | * | 2/2000 | Kinghorn et al. ............. 715/716 |
| 6,124,878 | A | * | 9/2000 | Adams et al. ................ 725/118 |
| 6,212,632 | B1 | * | 4/2001 | Surine et al. ..................... 713/2 |
| 6,222,592 | B1 | * | 4/2001 | Patel ........................... 348/614 |
| 2002/0012530 | A1 | * | 1/2002 | Bruls ........................... 386/109 |

FOREIGN PATENT DOCUMENTS

| EP | 0 735 776 A2 | 10/1996 |
| EP | 0 782 332 A2 | 7/1997 |
| EP | 0 843 485 A2 | 5/1998 |
| JP | 8-331164 | 12/1996 |
| JP | 9-102793 | 4/1997 |
| JP | 9-261630 | 10/1997 |
| JP | 9-307865 | 11/1997 |
| JP | 10-174185 | 6/1998 |

OTHER PUBLICATIONS

Kunzman, Adam, Wetzel, Alan, 1394 High Performance Serial Bus: The Digital Interface for ATV, Jun. 12, 1995.*
IEEE Standards Board, IEEE Standard for a High Performance Serial Bus, 1995.*
Bissell, R.A. et al., "The Set-Top Box For Interactive Services", BT Technology Journal, vol. 13. No. 4, Oct. 1995, pp. 66-77.
Hartwig, S. et al, "Broadcasting and Processing of Program Guides for Digital TV", SMPTE Journal, vol. 106, No. 10, Oct. 1997, pp. 727-732.
McManus, J. et al., "Video-on-Demand Over ATM: Constant Rate Tramsmission and Transport", IEEE Journal on Selected Areas in Communications, vol. 14, No. 6, Aug. 1996, pp. 1087-1098.

* cited by examiner

*Primary Examiner*—Hunter B. Lonsberry
(74) *Attorney, Agent, or Firm*—Lerner, David, Littenberg, Krumholz & Mentlik, LLP

(57) ABSTRACT

A broadcast receiver includes an input unit, a receiving unit, a control unit, a main memory, a demultiplexer unit, and a decoding unit. When a user switches on or resets the main power by operating the input unit, an operation signal (main-power switching-on signal or reset signal) is supplied to the control unit via a bus. The control unit reads, via the bus, the bit-rate value of transport stream data stored in a program area in a main memory. The control unit computes the optimal size of the FIFO buffer area based on the read bit-rate value and confirms it. The control unit reserves, in the main memory, the FIFO buffer area based on a result of the computation.

19 Claims, 2 Drawing Sheets

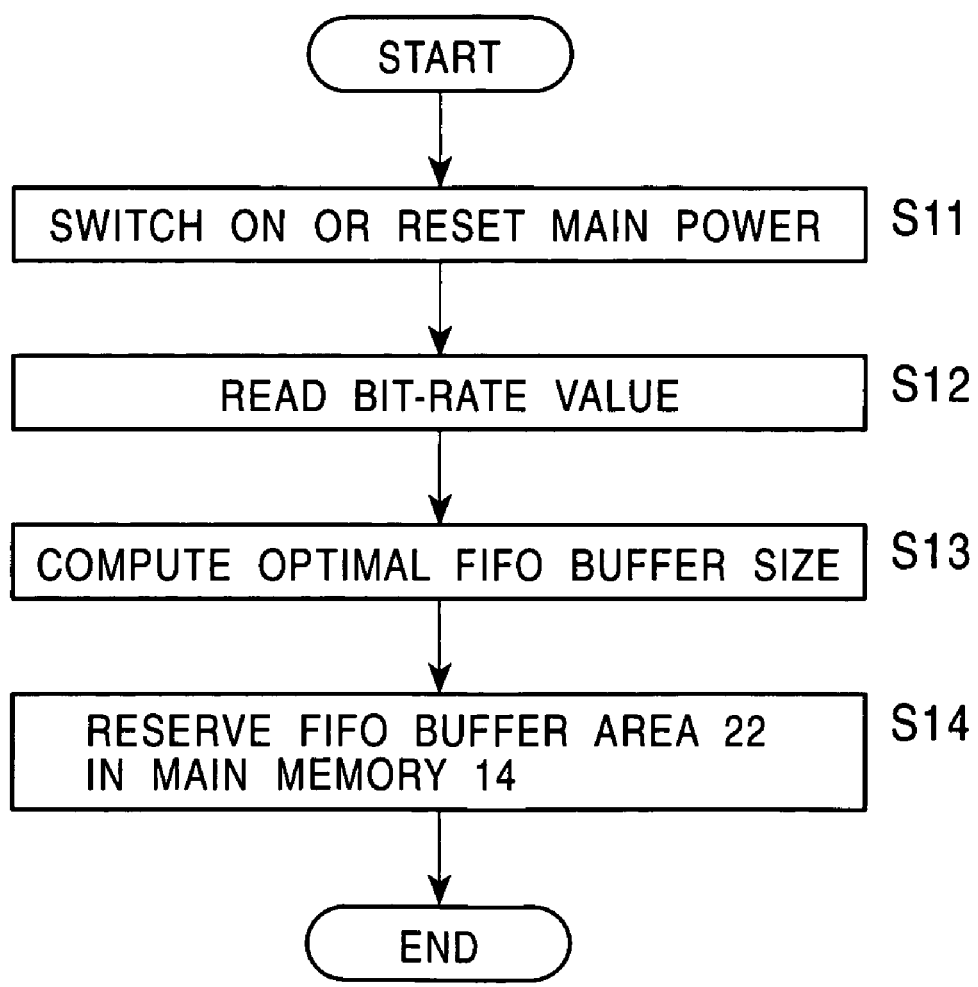

BROADCAST RECEIVER, CONTROL METHOD THEREFOR, AND PROGRAM

BACKGROUND OF THE INVENTION

The present invention relates to broadcast receivers, control methods therefor, and programs, and in particular, to a broadcast receiver, a control method therefor, and a program in which, in a set-top box (STB) or the like, a first-in first-out (FIFO) buffer area, required for separating input transport stream data, can be optimized (minimized in size) in accordance with the bit rate of the input transport stream data.

In STBs, etc., processing that separates multiplexed transport stream data into various types of data (such as video data and audio data) is performed by hardware. Accordingly, the FIFO buffer (fixed to a size determined by the maximum bit rate of the input transport stream data), required to temporarily store the input transport stream data, is realized as part of the hardware.

The bit rate of the input transport stream data differs depending on the country, the broadcaster, etc. Accordingly, after using the hardware to determine the design, as described above, when an STB for another destination or another broadcaster is developed, a problem arises in that since the bit rates of the input transport stream data differ, the hardware design must be substantially modified to achieve an optimal size (area) so as to prevent the input transport stream data from overflowing.

SUMMARY OF THE INVENTION

Accordingly, objects of the present invention are to provide a broadcast receiver and a control method therefor in which, when the bit rate of input transport stream data is changed, a FIFO buffer area (size) is optimized (minimized) without changing the hardware design, and to provide a program for the receiver.

To this end, according to an aspect of the present invention, the foregoing objects are achieved through provision of a broadcast receiver for separating multiplexed transport stream data. The broadcast receiver includes a receiving unit for receiving the multiplexed transport stream data; a memory for storing the received transport stream data; a processing unit which determines an optimal buffer size in accordance with a bit rate of the received transport stream data and which reserves, in the memory, a storage area having the optimal buffer size; and a demultiplexer for separating transport packets from the received transport stream data using the reserved storage area.

According to another aspect of the present invention, the foregoing objects are achieved through provision of a control method for a broadcast receiver for receiving multiplexed transport stream data, for storing the received transport stream data in a memory, and for separating a desired transport packet from the stored transport stream data. The control method includes determining an optimal buffer size in accordance with a bit rate of the received transport stream data; and reserving, in the memory, a storage area having the optimal buffer size. The received transport stream data is stored in the reserved storage area, and the reserved storage area is used to separate the desired transport packet from the stored transport stream data.

According to another aspect of the present invention, the foregoing objects are achieved through the provision of a storage medium recorded with a program for controlling a broadcast receiver to receive multiplexed transport stream data, store the received transport stream data in a memory, and separate a desired transport packet from the stored transport stream data. The program includes determining an optimal buffer size in the memory in accordance with a bit rate of the received transport stream data; and reserving, in the memory, a storage area having the optimal buffer size.

BRIEF DESCRIPTION OF THE DRAWINGS

FIG. 3 is a flowchart illustrating a process performed when a control unit 13 shown in FIG. 1 changes the buffer size based on the bit rate of transport stream data.

DETAILED DESCRIPTION

Figure 1:
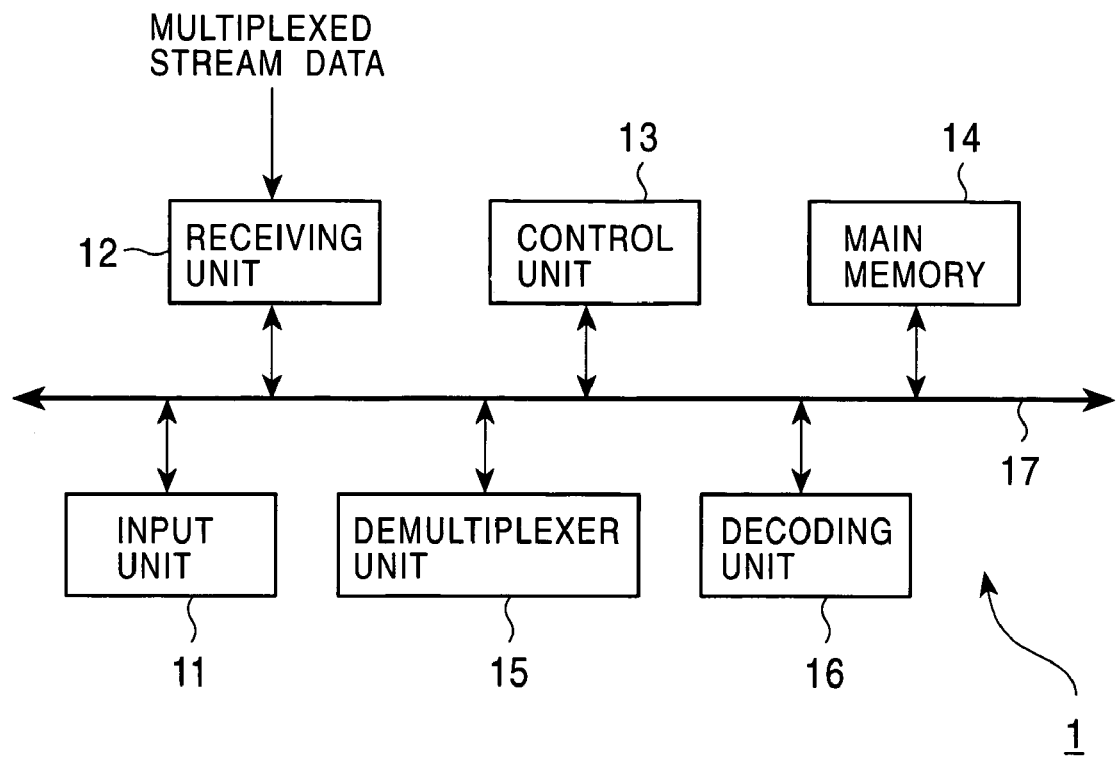
FIG. 1 is a block diagram showing the structure of an STB 1 according to an embodiment of the present invention.

FIG. 1 shows the structure of an STB 1 according to an embodiment of the present invention.

A user uses an input unit 11 to perform the desired operations (e.g., the switching-on and resetting of the main power, etc.). The input unit 11 supplies an operation signal to a control unit 13 via a bus 17.

A receiving unit 12 receives externally-supplied multiplexed transport stream data, and supplies the received transport stream data to a main memory 14 via the bus 17. The receiving unit 12 includes a tuner, a decoding circuit, and a correcting circuit.

Figure 2:
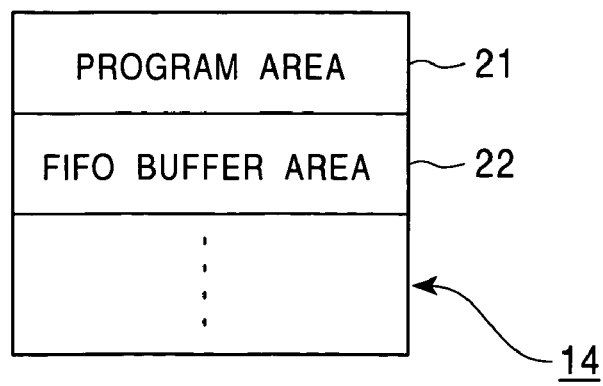
FIG. 2 is an illustration of an example of a main memory 14 shown in FIG. 1.

The main memory 14 includes a program area 21 and a FIFO buffer 22, as shown in FIG. 2. The program area 21 stores a program in which processing to be performed when the STB 1 is booted (the switching-on or resetting of the main power) is described. In the program, a value of the bit rate of the transport stream data to be input to the receiving unit 12 is described at a predetermined position, and the value of the bit rate can be rewritten as required. Accordingly, when the value of the bit rate to be input is changed, it is only required that the described value of the bit rate be rewritten. The FIFO buffer area 22 temporarily stores the transport stream data supplied from the receiving unit 12. The optimal size (area) of the FIFO buffer area 22 is determined based on the result of arithmetic operation by the control unit 13 (described below).

When the control unit 13 is supplied with the operation signal (a main-power switching-on signal or a reset signal) from the input unit 12, it reads, from the program area 21 of the main memory 14, the bit-rate value of the transport stream data stored beforehand. The control unit 13 computes the optimal size of the FIFO buffer area 22, based on the read bit-rate value, and reserves, in the main memory 14, the FIFO buffer area 22 based on a result of the computation. The transport stream data from the receiving unit 12 is supplied and stored in the FIFO buffer area 22 reserved in the main memory 14. In view of the cost of memory, it is advantageous to set the optimal size of the FIFO buffer area 22 to the minimum necessary value which will prevent the stream data from overflowing.

A demultiplexer unit 15 is supplied with the transport stream data from the FIFO buffer area 22 of the main memory 14. The demultiplexer unit 15 separates the supplied transport stream data into various types of data (e.g., video data, audio data, etc.), and supplies the separated data to a decoding unit 16 via the bus 17.

Next, a process performed when the control unit 13 determines the optimal size of the FIFO buffer area 22 based on the bit-rate value of the transport stream data is described with reference to the flowchart shown in FIG. 3.

In step S11, when the user switches on or resets the main power by operating the input unit 11, the operation signal (main-power switching-on signal or reset signal) is supplied to the control unit 13 via the bus 17.

In step S12, the control unit 13 reads, via the bus 17, the bit-rate value of the transport stream data stored beforehand in the program area 21 of the main memory 14.

In step S13, the control unit 13 computes, based on the read bit-rate value, the optimal size of the FIFO buffer area 22, and confirms it.

In step S14, the control unit 13 reserves, based on a result of the computation in step S13, the FIFO buffer area 22 in the main memory 14, and the process is terminated.

In the foregoing description, the case where the value of a bit rate of transport stream data is described beforehand in a program is described. By way of example, by providing a detector for detecting an input bit rate, an optimal FIFO buffer size may be determined by performing the above-described computation based on the value of the bit rate output from the detector.

In the foregoing description, the main memory 14 is used in a form in which it is divided into the program area and the FIFO buffer area. However, a memory for storing a program may be provided separately from the main memory 14. For example, a rewritable nonvolatile flash memory may be used as the memory for storing a program, and a nonvolatile RAM may be used as the memory for the FIFO buffer.

In the present invention, the types of provision media for providing the user with a computer program executing the above-described process include not only information recording media such as magnetic disks and CD-ROMs but also network-based transmission media such as the Internet and digital satellite.

As described above, according to the present invention, based on the bit rate of transport stream data, an optimal buffer size is computed, and based on the result of the computation, the buffer area is changed, whereby memory can be effectively used.

What is claimed is:

1. A broadcast receiver for separating multiplexed transport stream data, said broadcast receiver comprising:
   a receiving unit for receiving the multiplexed transport stream data;
   a memory for storing said received transport stream data and containing a pre-stored bit-rate value that indicates the bit-rate of said transport stream data before receipt of said transport stream by said receiving unit and corresponds to a country of origin of the broadcast;
   a processing unit which reads said pre-stored bit rate value from said memory and determines an optimal buffer size in accordance with said bit-rate value and which reserves, in said memory, a storage area having said optimal buffer size in response to a power-on signal in said broadcast receiver, wherein said optimal buffer size is a minimum necessary size to prevent the stream data from overflowing; and
   a demultiplexer for separating transport packets from said received transport stream data using said reserved storage area.

2. A broadcast receiver according to claim 1, further comprising a program that describes said optimal buffer size and that is prestored in said memory.

3. A broadcast receiver according to claim 1, further comprising a program that describes said optimal buffer size and that is stored in a non-volatile memory.

4. A broadcast receiver according to claim 1, wherein said optimal buffer size is determined by detecting said bit rate of said received transport stream data.

5. A method for controlling a broadcast receiver to receive multiplexed transport stream data, store the received transport stream data in a memory, and separate a desired transport packet from the stored transport stream data, said control method comprising:
   retrieving a bit-rate value pre-stored in the memory, the bit rate value indicating the bit rate of the transport stream to be received by the receiver and corresponding to a country of origin of the received transport stream data;
   determining an optimal buffer size in the memory in accordance with the bit-rate value retrieved from the memory and in response to a power-on signal generated by the broadcast receiver, wherein said optimal buffer size is a minimum necessary size to prevent the stream data from overflowing;
   reserving, in the memory, a storage area having the optimal buffer size;
   storing the received transport stream data in the reserved storage area; and
   using the reserved storage area to separate the desired transport packet from the stored transport stream data.

6. A control method according to claim 5, further comprising executing a program that is prestored in the memory in response to said power-on signal.

7. A control method according to claim 5, further comprising executing a program that is stored in a nonvolatile memory in response to said power-on signal.

8. A control method according to claim 5, wherein the optimal buffer size is determined by detecting the bit rate of the received transport stream data.

9. A computer-readable information recording medium storing a computer-readable program, the program being operable to perform a method for controlling a broadcast receiver to receive multiplexed transport stream data, store the received transport stream data in a memory, and separate a desired transport packet from the stored transport stream data, the program being executed by a control processor immediately in response to a power reset signal generated by the broadcast receiver, the method comprising:
   retrieving a bit-rate value pre-stored in the memory, the bit rate value indicating a country of origin of the broadcast and the data rate of the transport stream to be received by the receiver;
   determining an optimal buffer size in the memory in accordance with the bit-rate value retrieved from the memory, wherein the optimal buffer size is a minimum necessary size to prevent the stream data from overflowing; and
   reserving, in the memory, a storage area having the optimal buffer size.

10. A computer-readable information recording medium according to claim 9, wherein the broadcast receiver is controlled by the control processor.

11. A computer-readable information recording medium according to claim 9, wherein the method further comprises detecting the bit rate of the received transport stream data, wherein the optimal buffer size is determined in accordance with the detected bit rate.

12. A broadcast receiver according to claim 1, wherein said power-on signal is generated immediately when the main power of said broadcast receiver is switched on.

13. A broadcast receiver according to claim 12, further comprising a user settable input unit that is used to switch on said broadcast receiver and to generate said power-on signal.

14. A broadcast receiver according to claim 1, wherein said power-on signal is generated immediately when the main power of said broadcast receiver is reset.

15. A broadcast receiver according to claim 12, further comprising a user settable input unit that is used to reset said broadcast receiver and to generate said power-on signal.

16. A control method according to claim 5, wherein the determining step further comprises detecting the power-on signal, which is generated immediately when the main power of the broadcast receiver is switched on.

17. A control method according to claim 16, wherein the broadcast receiver is switched on by a user.

18. A control method according to claim 5, wherein the determining step further comprises detecting the power-on signal, which is generated immediately when the main power of the broadcast receiver is reset.

19. A control method according to claim 18, wherein the broadcast receiver is reset by a user.

* * * * *